United States Patent
Melone

[15] 3,683,347
[45] Aug. 8, 1972

[54] REMOTE SENSING INDICATOR
[72] Inventor: Robert R. Melone, Des Plaines, Ill.
[73] Assignee: Illinois Tool Works Inc., Chicago, Ill.
[22] Filed: Jan. 12, 1970
[21] Appl. No.: 2,031

[52] U.S. Cl................340/244 R, 340/331, 307/296
[51] Int. Cl.............................................G08b 21/00
[58] Field of Search..............................340/59, 244

[56] References Cited
UNITED STATES PATENTS

| | | |
|---|---|---|
| 3,242,794 | 3/1966 | Crane.......................340/244 |
| 3,457,559 | 7/1969 | Hubbard...................340/244 |
| 3,384,885 | 5/1968 | Forbush......................340/59 |
| 3,432,840 | 3/1969 | Neapolitakis et al........340/59 |

Primary Examiner—Thomas B. Habecker
Attorney—Olson, Trexler, Wolters & Bushnell

[57] ABSTRACT

A remote sensing device which electrically indicates when a liquid within a container is at or below a predetermined level. The remote sensing device includes a flasher type indicator lamp connected in series with a silicon controlled rectifier. The silicon controlled rectifier is rendered conductive by a suitable gate voltage and the flasher indicating lamp is thus energized. The gate voltage is maintained on the silicon controlled rectifier as long as a liquid level sensor senses a liquid level below a predetermined level. When the liquid again raises to the desired level the gate voltage is removed and the flashing of the indicator lamp will cause anode voltage to be removed from the silicon controlled rectifier and render it inoperative.

10 Claims, 5 Drawing Figures

Inventor
Robert R. Melone
By: Olson, Trexler, Wolters & Bushnell
attys

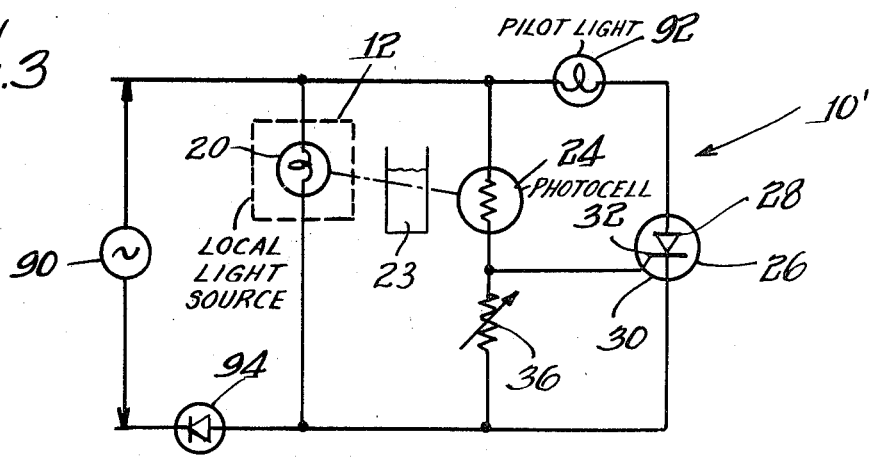
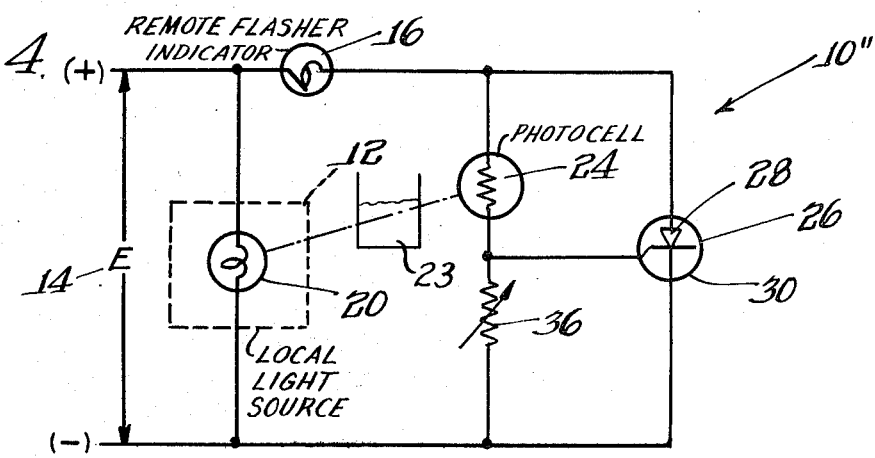
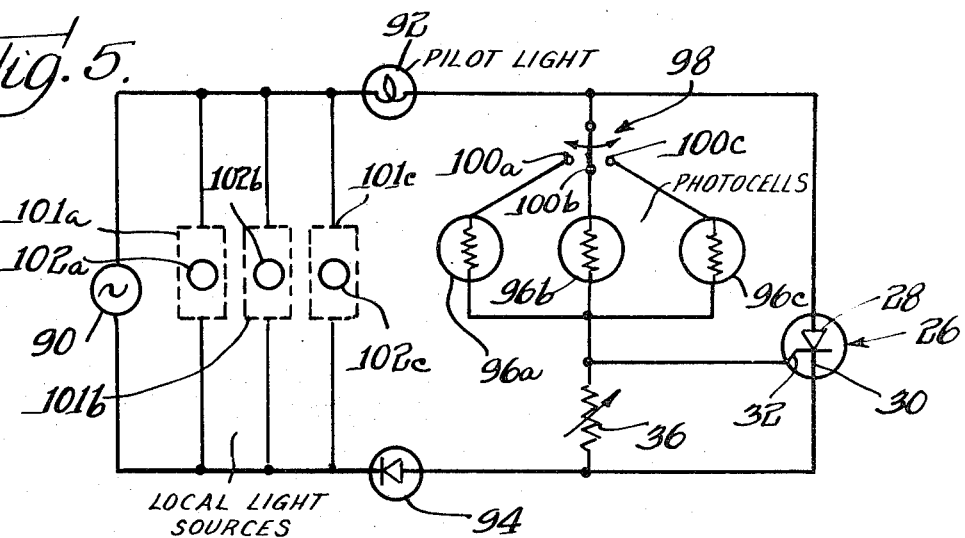

REMOTE SENSING INDICATOR

This invention relates generally to an indicating device and more particularly to an electrical circuit including an indicator for remotely indicating the level of a liquid within a container.

A modern type of device for indicating the level of a liquid within a container is disclosed in applicant's own pending application, Ser. No. 816,330, filed Apr. 15, 1969 now U.S. Pat. No. 3,553,666. This application discloses a device for remotely indicating the liquid level within a container such as a brake cylinder of an automobile. The device includes a light source positioned at the container, an assembly of prisms for receiving light rays from the light source and reflecting such light rays to a light conveying device, known commercially as a fiber bundle when the liquid is at a level so as not to interfere therewith. The fiber bundle receives the light rays from the assembly of prisms and thereafter directs the rays to any desired point, as for example, to the dashboard of an automobile. For a more detailed discussion, reference is made to the above cited application.

Although the above discussed device operates in an excellent manner, it has been found that such a device in combination with an electrical circuit for remotely indicating the level of a liquid within a container has additional advantages above those found in the above mentioned application.

Accordingly, an important object of the present invention is to provide an improved device for remotely indicating the level conditions of liquid in a container, including the contemporaneous indication of liquid level conditions in a plurality of such containers.

The foregoing and other objects and advantages will be more apparent from the following detailed description when considered in connection with the accompanying drawings, wherein:

FIG. 3 is a schematic wiring diagram of a first modification of the device of FIG. 1;

FIG. 4 is a schematic wiring diagram of a second modification of the device of FIG. 1; and, FIG. 5 is a schematic wiring diagram of a third modification of the device of FIG. 1.

Figure 1:
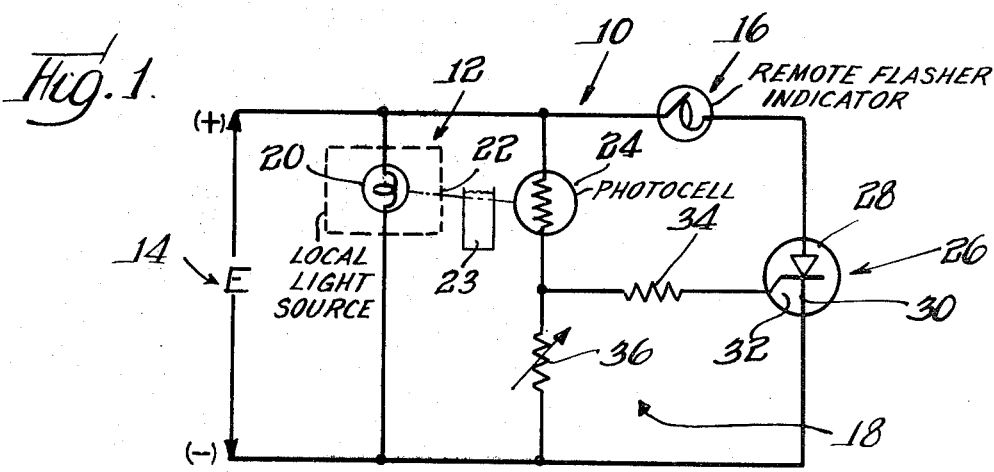
FIG. 1 is a schematic wiring diagram of the electrical circuit of a first embodiment of the remote sensing device.

Referring now in greater particularity to the drawings and particularly to FIG. 1 which discloses a remote sensing device 10 including a local light source 12, of the type discussed in pending application Ser. No. 816,330, which is physically positioned in a container such as the brake cylinder of an automobile (not shown) for emitting an optical signal when the liquid in the container is at a predetermined level so as not to interfere therewith. A source of direct current power 14 having positive and negative sides is electrically connected to the local light source 12 and supplies power thereto. A remote indicating device 16 such as a pilot light is electrically connected to and receives power from the direct current source 14 for remotely indicating that the liquid is at the predetermined level. The remote indicator 16 would be positioned, for example, on the dashboard of an automobile (not shown). The remote indicator device 16 is energized by the power supply through a circuit 18, which closes the circuit between the power supply and pilot light, when the liquid is at the predetermined level.

The local light source 12 includes a light 20 which is electrically connected across the source of power 14. As stated above, with regard to pending application Ser. No. 816,330, the source of light emits light rays to an assembly of prisms (not shown) and thereafter the light rays are received by a fiber bundle (not shown) for directing the light rays to an output point 22 of the local light source when the liquid in the container 23 is at or below a predetermined level so as not to interfere therewith. The light source 12 is positioned within the container 23 which may have transparent side walls so that light can pass therethrough.

The circuit 18 for allowing or preventing energization of the remote indicator 16 by power supply 14 includes a photocell 24, of the type whose resistance is inversely proportional to the level of ambient illumination thereon, electrically connected across the power source 14 and electrically behind the light source 20. The photocell is positioned so as to receive the light rays emanating from point 22. A silicon controlled rectifier 26 having an anode 28, a cathode 30 and a gate 32 is also included in the circuit 18 and is electrically connected across the power source 14 electrically behind the photocell 24. The anode 28 of silicon controlled rectifier 26 is connected to the positive side of the source of power 14 through remote indicator 16 which is positioned intermediate the photocell and anode 28. The cathode 30 is connected to the negative side of source 14 and the gate 32 is connected through a gate resistor 34 to a point intermediate the photocell 24 and a variable trimmer resistor 36 which is connected in series with the photocell 24 across the power source 14. The trimmer resistor provides a voltage dividing network with the photocell for proper triggering of the silicon controlled rectifier as discussed hereinafter and the variability characteristic of the trimmer resistor is required to allow compensation for the variation in photocell resistance that is encountered in manufacture.

Referring now to the operation of the remote device 10, the prismatic portion of local light source 12 is submerged in a liquid within the container 23 thus preventing light rays emanated from light 20 from reaching point 22. The photocell 24, having substantially infinite resistance when no appreciable light rays impinge thereon, prevents any substantial current from source 14 to pass through the photocell and to the gate 32 of silicon controlled rectifier 26 which therefore prevents the silicon controlled rectifier from turning on. While the silicon controlled rectifier is in an "off" state, the series circuit, including the silicon controlled rectifier, the power source 14 and the remote indicator 16, is an open circuit and therefore the remote indicator is in an unenergized state. When the liquid within the container reaches a predetermined level, allowing the light rays emanated by the light 20 to reach point 22 and thereafter to illuminate the photocell 24, the resistance of the photocell decreases such that a current is allowed to flow therethrough for providing a gate signal to the silicon controlled rectifier which triggers the silicon controlled rectifier into an "on" or conducting state. This allows current to pass through the remote indicator 16 for energization thereof and indication that the liquid level has reached the predetermined level.

It should be noted that while a silicon controlled rectifier can be triggered into a conducting state with a gate signal, it can only be turned off by interrupting the supply in the anode circuit. For this reason, the remote indicator 16 is of the flasher type, or put in other terms, has a built-in circuit for periodically interrupting the current therethrough, thereby periodically interrupting the supply in the anode circuit of the silicon controlled rectifier 26 for proper turn off. As long as the silicon controlled rectifier is provided with a gate signal at its gate electrode 32, the silicon controlled rectifier will remain in its conduction state.

It should further be noted that the exact physical structure of the local light source 12 as described with respect to pending application Ser. No. 816,330 is not essential as long as a device is provided which functions in the same manner as local light source 12 as described above.

Figure 2:
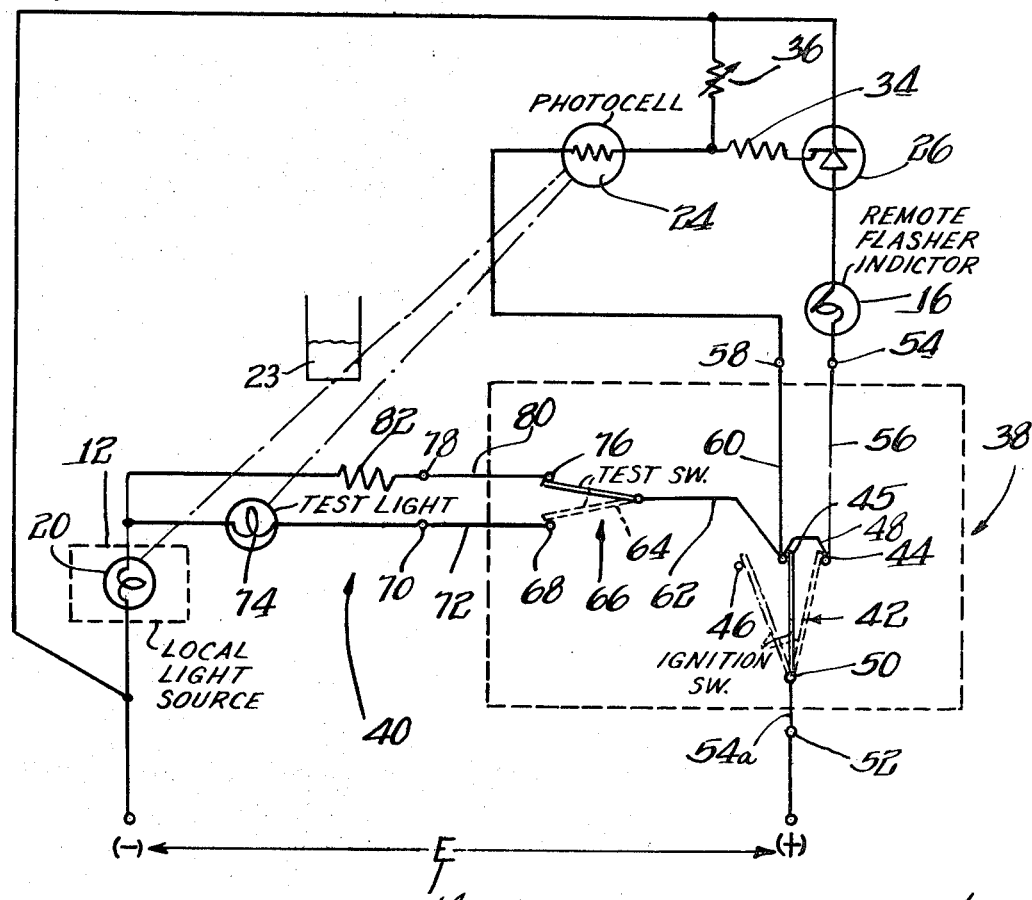
FIG. 2 is a schematic wiring diagram displaying the circuit of FIG. 1 connected to an ignition circuit of an automobile ignition system including a photoelectric cell testing circuit.

Turning now to FIG. 2, the remote sensing device 10 described with reference to FIG. 1 is shown electrically connected in schematic form to a standard ignition system 38 of an automobile (not shown) and a photocell check-out circuit 40. The ignition system includes a multi-position switch represented by 42 and 66 with poles 44 and 45 for operating the automobile engine and the sensing device, and a pole 46 representing the inoperation of the automobile. A jumper 48 connects poles 44 and 45 for reasons discussed hereinafter and the switch is connected into the circuit 10 in a manner described below. It is to be understood that the multi-position switch may be an integral gang-type switch.

The movable contact 50 of the switch portion 42 is connected to terminal 52 by lead 54a, the other side of the terminal being connected to the positive side of the direct current battery supply. The pole 44 is connected to terminal 54 through lead 56, the other side of terminal 54 being connected to one side of the remote indicator 16. The pole 45 is also connected to terminal 58 via lead 60, the other side of the terminal 58 being connected to one side of the photocell 24. The pole 45 is finally connected via jumper 62 to the movable contact 64 of the switch portion 66 which is part of the photocell check-out circuit 40 described hereinafter. One pole 68 of the switch portion 66 is connected to a terminal 70 via lead 72, the other side of the terminal 70 being connected to one side of a test light 74 which also is part of the photocell check-out circuit 40. The test light 74 is connected in series with the light source 20 of the local sensing device 12. The other pole 76 of the switch 66 is connected to terminal 78 via lead 80, the other side of the terminal being connected to one side of a dropping resistor 82 which is connected in parallel with test light 74 and in series with light source 20. The resistor 82 has been added to the circuit 10 to provide a voltage drop in series with light source 20 during normal operation of the circuit as described hereinafter.

Functionally, the switch portion 42, when in its "off" position 46 opens the circuit between the power supply 14 and remainder of the circuit of device 10 thus preventing the supply 14 from delivering power thereto. When the switch contact 50 is moved to position 44, switch contact 66 is moved to position 68 which represents the switch position while the automobile engine is being cranked for starting. During this time, test light 74 is operative causing the required resistance change in photoelectric cell 24, thereby energizing indicator 16, and allowing the system components to be checked for function, regardless of the level of liquid within the container. When the engine has started, and the ignition switch is released, switch portions 42 and 64 occupy positions 45 and 76 respectively, representing the normal run position during operation of the automobile or vehicle. It should be noted that, since the power supply to the controlled rectifier is momentarily interrupted between the start and normal run switch positions, indicator 16 could be a conventional bulb, if so desired, without hindering the operation of remote sensing device 10.

Turning to FIG. 3, a modified version 10' of the remote sensing device 10 of FIG. 1 is shown. Accordingly, like elements will be designated by like numerals. The device 10' is provided with an alternating current power supply 90 rather than the direct current power supply 14 of FIGS. 1 and 3 which therefore allows a conventional pilot light 92 to be used rather than the flasher type 16 since the source voltage commutates through zero and silicon controlled rectifier turn off is no problem. In addition, since alternating current voltage is applied, a diode (half-wave rectifier) 94 is positioned in the circuit with its cathode connected to the power supply 90 and with its anode connected to the cathode electrode 30 of the silicon controlled rectifier 26. This is required in order to block the positive voltage pulse that would otherwise occur at the gate 32 of silicon controlled rectifier 26 during that portion of the alternating current cycle when the anode voltage is negative, thereby averting damage to the silicon controlled rectifier. It should be noted that a full-wave rectifying device could also be used. However, a diode is preferred for economical reasons. Finally, it should be noted that the gate resistor 34 of FIGS. 1 and 2 has been removed.

The above described modification is electrically connected, and functions in the same manner as remote sensing device 10 of FIG. 1 with the exceptions noted above. A second modified version 10'' of the device 10 of FIG. 1 is shown in FIG. 4. The device 10'' utilizes the same components as the device 10 except for gate resistor 34, which is eliminated. The remote indicating device 16 is repositioned electrically ahead of the circuit 18 which includes the photocell 24 and trimmer resistor 36, rather than directly ahead of the silicon controlled rectifier 26 as shown in FIG. 1. Although either circuit, represented by FIG. 1 or FIG. 4, is satisfactory, the positioning difference alters the nature of the trigger voltage. It can be readily seen that when the remote sensing indicator 16 is positioned ahead of the circuit 18, as in FIG. 4, the trigger voltage across the photocell and trimmer resistor is pulsating DC. Positioning the remote sensing indicator directly ahead of the silicon controlled rectifier will result in a constant DC trigger voltage. It should be noted that the above described circuit of FIG. 4, may use an alternating current source in place of the direct current source shown, in which case the remote indicating device 16 would be of the conventional type, as discussed with reference to FIG. 3, and the trigger voltage would always be pulsating half-wave AC regardless of the position of remote indicator 92.

Turning to FIG. 5, another modified remote sensing device 10''', which is similar to the remote sensing device 10' of FIG. 3, with the remote indicator 92 repositioned at the head of the circuit 18 as discussed with respect to FIG. 4 is shown. Three photocells 96a, 96b and 96c electrically connected in parallel and a three position selector switch 98, with the three positions indicated at 100a, 100b and 100c, connected in series therewith replace photocell 24 of FIG. 3. The switch 98 has its common terminal connected intermediate the remote indicator 92 and anode 28 of silicon controlled rectifier 26. The positions 100a, 100b and 100c of the switch are connected respectively to one end of each of the photocells 96a, 96b and 96c, whose other ends are connected together, intermediate one side of trimmer resistor 36 and gate electrode 32 of silicon controlled rectifier 26.

Three local light sources 101a, 101b and 101c, with respective light sources 102a, 102b and 102c electrically connected in parallel, replace local light source 12 of FIG. 3. Each light source is positioned at a different container such as, for example, the battery, the brake cylinder or the transmission case of an automotive system (not shown) for sensing the liquid level of each container and each light source is optically aligned with a photocell 96a, 96b and 96c respectively. The liquid level in any one of the above mentioned containers can be determined in the same manner described with reference to FIGS. 1 to 4 by positioning switch 98 to include a corresponding photocell 96a, 96b and 96c. Once this has been done the device 10''' functions in the same manner as discussed above.

It should be noted that the device 10''' may be modified to use direct current power rather than alternating current power as discussed above and further the remote sensing indicator may be repositioned ahead of the silicon controlled rectifier as discussed above.

It should be finally noted that the term "optical signal" used with reference to the local sensing device described above refers to a signal in both the visible and invisible range as well as all electromagnetic signals.

While particular embodiments of the invention have been shown, it should be understood, of course, that the invention is not limited thereto since many modifications may be made; and it is, therefore, contemplated to cover by the appended claims any such modifications as fall within the true spirit and scope of the invention.

It should also be noted that the above described circuits could employ light actuated silicon controlled rectifiers (LASCR). These devices would perform the same function as the silicon controlled rectifiers described above. In addition, this would eliminate the need for the photocell-trimmer voltage divider, since the LASCR is light sensitive in itself and is triggered into a conducting state when illuminated.

The invention is claimed as follows:

1. A remote sensing device for indicating the level of liquid within a container comprising in combination, a light source positioned within the container for emitting an optical signal, remote pilot light means positioned outside of the container, a photoelectric cell for receiving said optical signal from said light source when the liquid in the container is at or below said predetermined level, said photoelectric cell generating an electric signal in response to said optical signal; control rectifier means having anode, cathode and gate electrodes, said anode and cathode electrodes being connected in series with said remote pilot light means, said gate electrode being connected to said photoelectric cell to render said silicon controlled rectifier conductive when the liquid in the container is at or below said predetermined level, a diode connected in series with the anode and cathode of said silicon controlled rectifier, and alternating current power source means connected to said remote pilot light means and said controlled rectifier.

2. A remote sensing device for indicating the level of a liquid within a container comprising in combination, a light source positioned within the container for emitting an optical signal; remote flasher means positioned outside of the container, said remote flasher means being responsive to said light source within said container for indicating when the liquid therein is at or below said predetermined level; a photoelectric cell for receiving said optical signal from said light source when the liquid in the container is at or below said predetermined level, said photoelectric cell generating an electrical signal in response to said optical signal, controlled rectifier means having anode, cathode and gate electrodes, said anode and cathode electrodes being connected in series with said remote flasher means, said gate electrode being connected to said photoelectric cell to render said controlled rectifier conductive when the liquid in the container is at or below said predetermined level, and power source means connected to said remote flasher means and said controlled rectifier, whereby said remote flasher means will ultimately allow said controlled rectifier to become non-conductive when the liquid in the container exceeds said predetermined level.

3. The remote sensing device of claim 2 further including a test light positioned outside of said container for developing a test optical signal to impinge upon said photoelectric cell, and a test switch connected in circuit with said test light for energizing the same thereby testing the operation of said remote flasher means and said silicon controlled rectifier. 4. The remote sensing device of claim 3 further including an ignition switch connected in circuit with said test switch and said test light and said remote flasher means and said silicon controlled rectifier so that the test light can be operated when the ignition switch is actuated.

5. A remote sensing device according to claim 2 wherein: said controlled rectifier has its anode electrically connected to a first side of said power supply through said remote indicator means and its cathode electrically connected to a second side of said power supply; said photoelectric cell and a variable resistor being electrically connected in series across said power supply, intermediate said power supply and said controlled rectifier; said gate electrode being connected intermediate said photoelectric cell and said variable resistor; and a light source electrically connected across said power supply, intermediate said power supply and said photoelectric cell and variable resistor.

6. A remote sensing device as set forth in claim 2 wherein said circuit means comprises a plurality of photoelectric cells, and switch means for selectively connecting any one of said cells and the gate of said controlled rectifier.

7. A remote sensing device, according to claim 2 wherein said power supply is a direct current power supply and said remote indicating means is a flasher type pilot light.

8. A remote sensing device according to claim 2 wherein said triggering means includes a variable resistor whereby the resistance of said resistor may be varied to compensate for variation in resistance of said photoelectric cell.

9. A remote sensing device according to claim 2, wherein said pilot light is electrically connected intermediate said anode electrode and the terminal common to said photoelectric cell and the positive side of said power supply.

10. A remote sensing device according to claim 2 wherein said pilot light is electrically connected intermediate the positive side of said power supply and the terminal common to said photoelectric cell and said anode electrode.

* * * * *